July 10, 1951     H. T. BAKER     2,560,325
HYDROCARBON SYNTHESIS
Filed Nov. 16, 1948
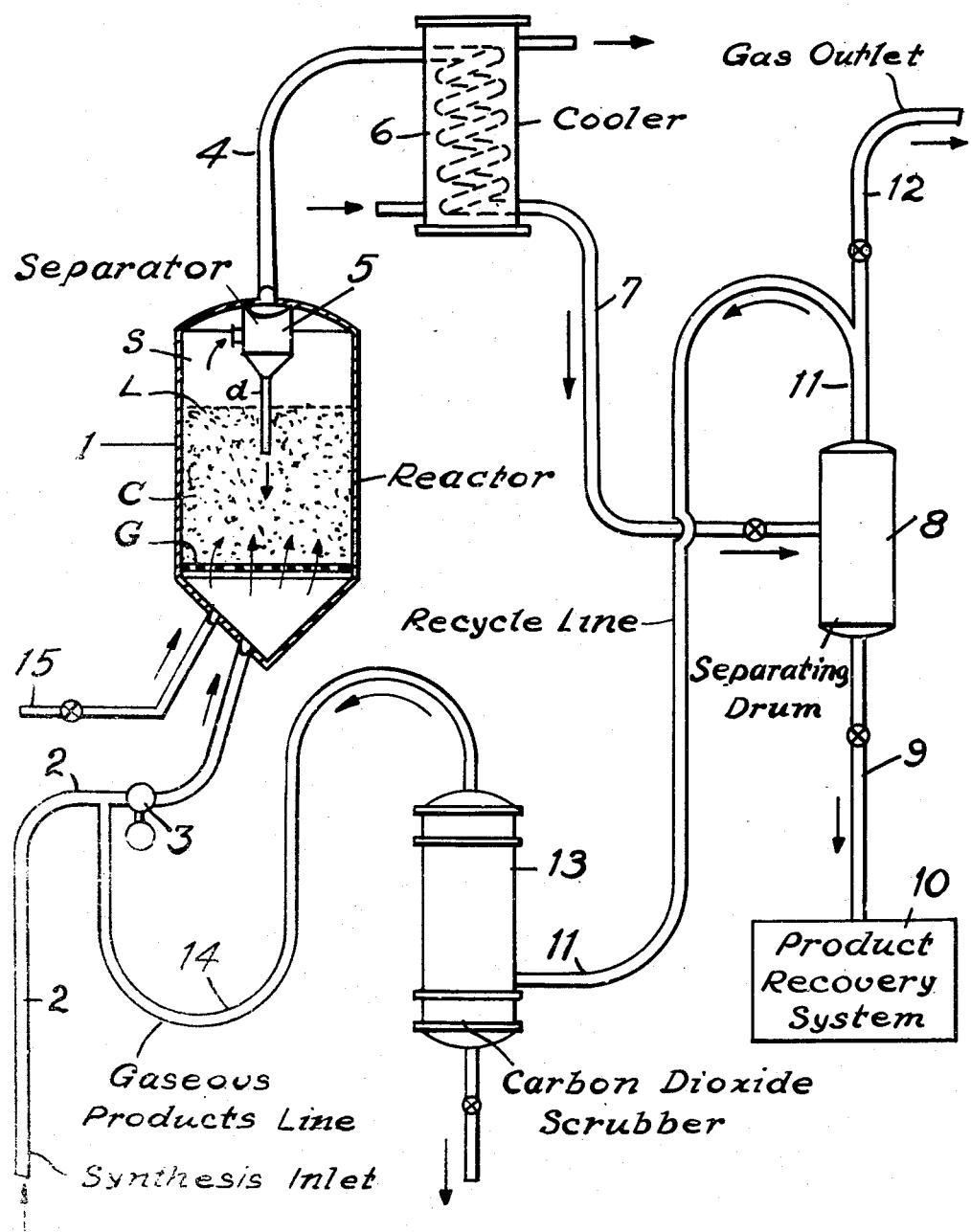
Harold T. Baker Inventor
By J. Cashman Attorney Patented July 10, 1951

2,560,325

UNITED STATES PATENT OFFICE 2,560,325

HYDROCARBON SYNTHESIS

Harold T. Baker, Baton Rouge, La., assignor to Standard Oil Development Company, a corporation of Delaware Application November 16, 1948, Serial No. 60,303

2 Claims. (Cl. 260—449.6)

The present invention relates to improvements in the interaction of oxides of carbon with hydrogen in the presence of a powdered iron catalyst which is maintained in the form of a fluidized bed in a reaction zone. More particularly, the present invention relates to maintaining the powdered iron catalyst in an active state for use in the conversion of oxides of carbon to form valuable hydrocarbons and oxygenated hydrocarbons, and at the same time maintaining said catalyst resistant to fragmentation and/or disintegration during use in the form of a fluidized bed thereof.

Heretofore and prior to the present invention, it was known that iron, particularly when promoted with minor amounts of certain alkali or alkaline earth compounds such as potassium fluoride, carbonate, acetate and numerous others, provided active catalysts for the synthesis of hydrocarbons and oxygenated organic compounds, from a synthesis feed gas containing carbon monoxide and hydrogen. It was also known that this type of operation may be carried out employing the so-called "fluidized" catalyst technique, a procedure wherein the iron in powdered form is suspended in the gasiform reactants in a reaction zone to form a dense turbulent suspension of catalyst in said gasiform material.

It has now been revealed that when the hydrocarbon synthesis operation is conducted in the presence of an iron catalyst, the catalyst tends to become (1) contaminated with carbonaceous deposits as the synthesis proceeds and the time comes when the catalyst, due to forces attending the carbon deposition, tends to undergo fragmentation or physical disintegration to the extent that an inordinately large proportion of fines (0–20 micron size material) is formed; and (2) to become oxidized. When the fluidized mass or catalyst bed contains a large quantity of fines, it becomes increasingly difficult to maintain the catalyst in a well fluidized state, and temperature control becomes impossible since in the ordinary fluidized catalyst operation, an attribute of such a process is that a separation is effected in the reactor of the bulk of the catalyst from the gasiform reactants and products, and further, since, when the catalyst contains an excessive quantity of fines, such separation is only effected with great difficulty, then obviously it is desirable to prevent fragmentation of the catalyst, for the fines thus produced tend to become entrained in and exit from the reactor with the gasiform products. Furthermore, the presence of fines in excessive quantities in the fluidized catalyst bed impairs the uniformity of mixing of the catalyst, which is an attribute of a well fluidized bed of catalyst. As a result of this impaired or poor mixing of the catalyst, it is difficult, if not impossible to maintain a substantially uniform temperature throughout the bed of catalyst, for there is a tendency to develop localized "hot spots" in the catalyst bed, to produce large amounts of carbonaceous deposits, or "coke" on the catalyst, and to be otherwise unsatisfactory. It should be noted that the hydrocarbon synthesis reaction is a highly exothermic one, and localized overheating will occur in a bed of powdered catalyst not undergoing thorough mixing.

It is the main purpose of the present invention to maintain a high carbide content of the powdered iron catalyst to render it resistant to serious oxidation and disintegration, and also to maintain the catalyst at a high level of activity and selectivity.

In brief compass, the present improvements involve "carbiding" the catalyst, that is, converting at least a portion of the catalyst, and usually a minor portion of the catalyst, to the compound $Fe_2C$, and employing the catalyst in a hydrocarbon synthesis reaction under conditions giving maximum yields of gasoline and other valuable products, and minimum catalyst disintegration. It has been found that when the catalyst has been in use for an extended period of time, say 200–300 hours, it loses activity and selectivity. According to the present invention this may be corrected by frequently interrupting the synthesis reaction between hydrogen and the oxides of carbon, say every 24 hours, and treating the catalyst for a short time (about 15 minutes to 2 hours) with hydrogen or a gas rich in hydrogen, and then switching back to synthesis gas, that is, the feed gas containing carbon monoxide and hydrogen in the proper proportions for the synthesis reaction. The result of this procedure is to hold the carbide carbon content of the catalyst at a high level, which retards oxidation of the catalyst, and also maintains the activity and selectivity of the catalyst at a high level, while at the same time retarding catalyst fragmentation and disintegration, all of which will be more fully explained hereinafter. Essentially no catalyst reduction occurs during these periods of hydrogen introduction, and the latter, that is, hydrogen introduction, is continued until the gas in the reaction zone is practically all hydrogen, that is to say, greater than 90% hydrogen by volume, and these intermittent treatments are conducted at frequent enough intervals to maintain the percent of iron as $Fe_2C$ at a level greater than about 20%; however, the interruptions for effecting carbiding are short enough in duration so that the production of synthesis products is not discontinued.

In the accompanying drawing, there is shown diagrammatically an apparatus layout in which the preferred modification of the present invention may be carried into effect.

Referring in detail to the drawing, 1 represents a reactor which is in the form of a cylinder having a conical base and a convex crown and carrying a distributing means G such as a screen or grid. The reactor 1 contains in operation a dense, turbulent, fluidized mass of powdered catalyst C having an upper dense phase level at L. Above L, extending to the top of the reactor, there is a dilute suspension of catalyst in gasiform material. The synthesis gas from line 2 is pumped by pump 3 into the bottom of reactor 1 at a point below the foraminous member G and thereafter is forced through G into the mass of catalyst C. The superficial velocity of the upflow gasiform material is controlled within the limits from 0.3 to 1.5 feet per second. "Superficial velocity" refers to the velocity when there is no catalyst in the reactor. As a matter of fact, due to the presence of the catalyst in the reactor, the actual velocity is obviously greater than that specified. Depending on the actual amount, or mass, of catalyst in the reactor, the dense, turbulent fluidized mass or bed will have the upper dense phase level L, indicated. It is desirable to have this upper dense phase level at a point below the top of the reactor, and, as previously indicated, it is desired in this technique to effect a separation of the main portion of the catalyst from the gasiform material, within the reactor, rather than to have the main bulk of the catalyst pass overhead with the exiting gasiform product.

The synthesis gas containing, of course, carbon monoxide and hydrogen, properly proportioned, contacts the catalyst in the reactor at synthesizing conditions of temperature, pressure and residence time, which conditions will be set forth hereinafter in detail; then the gasiform products emerge from the dense phase fluidized bed of catalyst and proceed toward the top of the reactor where they are withdrawn through a line 4. In passing through the space S, concentration of catalyst in gasiform material decreases sharply as the gases approach exit line 4. It is desirable to dispose several solids-gas separating devices such as centrifugal separators 5 (one shown) in disengaging space S, through which the gasiform material is forced for the purpose of separating entrained catalyst, which separated catalyst is then returned to the dense phase through dip pipes d (one shown). The gasiform product substantially freed of catalyst, issues as indicated through line 4, and then is discharged into the cooler 6 where it is brought to a temperature of about 100° F., thus causing the condensation of water, some of which may have been in the fresh feed but which is, for the most part, formed in the hydrocarbon synthesis process. Of course, normally liquid hydrocarbons and oxygenated hydrocarbons are also liquefied. The cooled product is withdrawn from cooler 6 through line 7 and discharged into the separation drum 8. The liquid condensate in drum 8 may be withdrawn through line 9 and delivered to the product recovery system 10 which has not been illustrated in detail nor will it be described in words. It will be sufficient merely to say that gasoline hydrocarbons, gas oil and heavier hydrocarbons and the various alcohols and other oxygenated compounds which are contained in the liquid product in line 9, may be separated from each other and purified according to known and conventional means.

The uncondensed gases and/or vapors in separator 8 may be withdrawn through line 11 and recycled, at least in part, to synthesis gas line 2. Of course, a portion of this gasiform material may be withdrawn through the present system through line 12 and processed according to known procedure. For instance, if the product in lines 11 and 12 contains gaseous olefinic hydrocarbons, these may be subjected to, say, polymerization in the presence of the so-called "solid" phosphoric acid catalyst to yield normally liquid products; or olefins in lines 11 and 12 may be subjected to dehydrogenation to form diolefins, useful as raw material in the manufacture of synthetic rubber or rubber-like products; or it may otherwise be used in a known or conventional manner.

The portion of the gaseous product in line 11 which is actually recycled through line 2 may first, however, be forced through a carbon dioxide scrubber 13 to remove the carbon dioxide, in whole or in part, before the gaseous products are recycled to line 2 by line 14. The scrubbing of the carbon dioxide from the gaseous product may be accomplished according to known procedure. One good way to remove the carbon dioxide from the said gases is to scrub them with an aqueous solution of triethanolamine.

There has been thus described the principal parts of an apparatus in which a synthesis operation may be carried out. The engineer will understand that accessory apparatus such as pumps, flow meters, temperature recording devices, etc., would be employed in the commercial plant to facilitate the control of the process and otherwise aid; but in the interest of simplicity, and to emphasize the present invention, these have been omitted from the drawing and the specification, since they do not go to the essence of this invention.

As previously stated, it has been found that improved results may be obtained by periodically or intermittently "carbiding" the catalyst. In carbiding the catalyst the flow of synthesis gas, that is to say, the gas in line 2 containing carbon monoxide and hydrogen is discontinued and there is fed instead to the reactor through line 15, a gas which is essentially hydrogen or is rich in hydrogen. The preferred synthesis conditions of pressure, temperature, etc. are maintained as when synthesis gas is fed to 1. The flow of hydrogen is preferably maintained for periods of 15 minutes to 2 hours, and until the gas in 1 consists of more than 90% by volume of hydrogen. When the hydrogen stream is discontinued and synthesis gas is again charged to the reactor, the iron is converted to iron carbide, at least in part, preferably greater than 20% of the catalyst being in the form of $Fe_2C$, and the iron carbide has the desirable attributes of (a) retarding oxidation of the catalyst, (b) promoting high conversion to normally liquid products, (c) promoting high selectivity of converted products to desired products, and (d) in conjunction with a high hydrogen partial pressure prevailing in the gas entering the reactor (say 125-275 p. s. i. a.), of repressing the tendency of excessive carbon deposit on the catalyst during the synthesis operation, and at the same time repressing the tendency of the catalyst to undergo physical disintegration or breakdown to sizes too small to be fluidizable.

The result of researches in connection with the present invention indicate that an iron catalyst will be converted in substantial part to iron carbide under synthesis reaction conditions, if the ratio of $$\frac{H_2-CO_2}{CO+CO_2}$$

is greater than unity. The foregoing ratio is often called the "effective" hydrogen to carbon monoxide ratio, and has reference to the total feed entering the reaction zone. When the ratio becomes less than unity, the catalyst, if high in iron carbide (say 35-45% of the iron is present in the form of $Fe_2C$), will decrease in carbide content. On the other hand, if the said ratio is substantially greater than unity, the catalyst will be carbided, if its prior carbide content was low.

When the synthesis reaction is interrupted and a hydrogen-rich gas introduced, the effective hydrogen to carbon monoxide ratio of the total feed to the reactor will reach a value considerably greater than unity. Following the hydrogen addition, synthesis gas is reintroduced, and the effective hydrogen to carbon monoxide ratio of the total feed to the reactor again approaches unity. Sometime during this interruption, optimum carbiding conditions are realized and the carbide carbon content of the catalyst is raised to a high level.

It is the purpose of the following experimental data to show (1) that very little reduction of catalyst can be expected when hydrogen is switched into the reactor in place of the synthesis gas, at synthesis conditions, i. e., about 650° F. and 400 p. s. i. g.; (2) that when the carbide content of the catalyst is maintained at a high level, oxidation of the catalyst is retarded; (3) that when the carbide carbon content falls to a low value, as it will after prolonged treatment with synthesis gas, the oxygen build-up in the catalyst is rapid; and (4) that when the carbide content is maintained at a high level, as it is in accordance with the intermittent hydrogenation feature of the present invention, the activity and selectivity of the catalyst are also maintained at a high level.

EXAMPLE I

In a certain pilot plant test, a batch of powdered "ammonia synthesis" or magnetite iron catalyst containing a minor proportion of $K_2CO_3$ was reduced for 50 hours at 650° F. and 400 p. s. i. g. at a total hydrogen ratio of 50 v./hr./w. (volumes of hydrogen at standard conditions per hour, per pound of catalyst in the reactor). Under these conditions the oxygen content of the catalyst was only reduced from 26.1 to 24.5 weight percent. An additional 10 hours of reduction was then carried out in which the hydrogen was freed of traces of carbon monoxide. This 10 hour reduction was carried out at 650° F. and 250 p. s. i. g. reactor pressure at a hydrogen rate of 62 v./hr./w. Under these conditions the oxygen content of the catalyst was reduced from 24.5 to 21.6 weight percent. From these data it can be seen that only a slight amount of catalyst reduction takes place at 650° F. and 400 p. s. i. g., normal synthesis temperature and pressure respectively.

EXAMPLE II

In another pilot plant test run, wherein the flow of synthesis gas was frequently interrupted by switching to hydrogen, and consequently the carbide content was maintained at high levels, the oxygen build-up, as the data indicate, was substantially retarded. In the run, the $H_2/CO$ ratio in the fresh feed when the latter was being fed to the reaction zone, was between 1.8 and 2/1, the pressure 400 p. s. i. g., and the temperature 650° F., the recycle ratio 2/1 and the feed rate about 15-30 v./hr./w., and a conversion level of $H_2+CO$ of about 94-95% were maintained. The catalyst on inspection, yielded the following data.

*Weight percent oxygen on catalyst*

| Hours | Period | As Recovered | Carbon and Oxygen-Free Basis | Weight Per Cent Iron as Iron Carbide |
|---|---|---|---|---|
| 1-198 | 57A | 11.0 | 13.1 | 26.5 |
| 199-374 | 57B | 9.9 | 12.0 | 30.3 |
| 375-618 | 57C | 10.3 | 13.5 | 30.9 |
| 619-821 | 57D | 9.9 | 14.9 | 19.6 |

The data above show that there was no significant build-up of oxygen on the catalyst because the carbide content was maintained at a high level by means of the intermittent hydrogen conditioning process of the invention.

EXAMPLE III

For comparison, the run below was not carried out with intermittent switching of the synthesis gas feed stream with the hydrogen stream. The synthesis conditions otherwise paralleled closely those given in Example 2.

*Weight percent oxygen on catalyst*

| Hours | Period | As Recovered | Carbon and Oxygen-Free Basis | Weight Per Cent Iron as Iron Carbide |
|---|---|---|---|---|
| 0 | Initial | 4.8 | 5.4 | 40 |
| 1-137 | 63A | 18.2 | 24.9 | 8 |
| 138-225 | 63B | 16.5 | 25.4 | 8 |

In the above run the carbide content was not maintained at a high level and consequently the rate of catalyst oxidation was more rapid than in Example 2.

EXAMPLE IV

To point out the favorable results of the reaction in terms of activity and selectivity when the intermittent hydrogenation step is incorporated in the hydrocarbon synthesis reaction, below are given two series of pilot plant runs, series 57 including the intermittent hydrogenation process, series 63 without such step. Reaction conditions are substantially those given in Example 2. On examining the data, it is evident that when the intermittent hydrogenation step of the invention is employed, resulting in maintenance of high catalyst carbide content, catalyst activities and selectivities are maintained at a high level, whereas without the intermittent hydrogenation step, activity and selectivity fall off.

| Hours | Period | Weight Per Cent Oxygen on Catalyst, Carbon and Oxygen-Free Basis | Weight Per Cent Iron as Iron Carbide | Activity As Volume, Per Cent CO Converted | Selectivity to C4+ Hydrocarbons |
|---|---|---|---|---|---|
| 1-198 | 57A | 13.1 | 26.5 | 99.5 | Normal. |
| 199-374 | 57B | 12.0 | 30.3 | 99.7 | Normal.[1] |
| 375-618 | 57C | 13.5 | 30.9 | 98.7 | Very Good.[3] |
| 619-821 | 57D | 14.9 | 19.6 | 98.5 | Good.[3,4] |
| 1-137 | 63A | 24.9 | 8 | 98.8 | Normal. |
| 138-225 | 63B | 25.4 | 8 | 96.2 | Poor.[4] |
| 226-352 | 63C | 22.2 | 7 | 94.3 | Very Poor. |

[1] About 140-170 cc. per cubic meter of CO+H₂ consumed.
[2] Over 190 cc. per cubic meter of CO+H₂ consumed.
[3] About 170-190 cc. per cubic meter of CO+H₂ consumed.
[4] Less than about 120 cc. per cubic meter of CO+H₂ consumed.

Thus, to recapitulate, the invention discloses a process for operating the hydrocarbon synthesis reaction wherein during the synthesis operation the synthesis gas is periodically replaced by hydrogen or a gas rich in hydrogen, and whereby a high carbide content of the catalyst is maintained. By keeping the carbide content of the catalyst high, good catalyst activity and selectivity are maintained and serious oxidation and disintegration of the catalyst are prevented. The hydrogen treatments are conducted at intervals frequent enough to maintain the iron carbide content of the catalyst above about 20%, and of short enough duration so that production of synthesis products is not discontinued.

Thus every 24 or so hours that synthesis gas is on stream is followed by a hydrogen conditioning period of about 15 minutes to 2 hours, depending upon the extent of carbiding desired and upon the synthesis conditions.

The foregoing description and exemplary operation, though illustrating a specific application of the invention is not intended to exclude other modifications obvious to those skilled in the art, and which are within the scope of the invention.

What is claimed is:

1. In the process of forming hydrocarbons and oxygenated hydrocarbons including normally liquid products in which a synthesis gas containing hydrogen and carbon monoxide in the ratio of about 1 to 2 mols hydrogen per mol of carbon monoxide is contacted with a fluidized bed of powdered alkali metal salt promoted iron catalyst in a reaction zone under synthesis conditions of temperature and pressure, the improvement which consists essentially in interrupting the flow of synthesis gas to the reaction zone about every 24 hours, treating the fluidized bed of catalyst with a gas predominantly hydrogen under substantially the same conditions of temperature and pressure prevailing during the synthesis reaction, for a period of from about 15 minutes to about 2 hours and until the effluent gas from the reaction zone is at least 90% hydrogen, thereafter passing synthesis gas into said reaction zone maintained under synthesis conditions of temperature and pressure whereby during the transition from a state wherein the effluent gas is at least 90% hydrogen to where undiluted synthesis gas is passed to said reaction zone, over 20% of the catalyst is converted into the form of $Fe_2C$ and the oxygen content thereof is below 15% by weight.

2. The method of claim 1 wherein the temperature in said reaction zone is about 650° F. and the pressure about 400 p. s. i. g.

HAROLD T. BAKER.

REFERENCES CITED

The following references are of record in the file of this patent:

UNITED STATES PATENTS

| Number | Name | Date |
|---|---|---|
| 2,251,554 | Sabel | Aug. 5, 1941 |
| 2,268,187 | Churchill, Jr. | Dec. 30, 1941 |
| 2,456,035 | Wobker | Dec. 14, 1948 |
| 2,479,999 | Clark | Aug. 23, 1949 |

FOREIGN PATENTS

| Number | Country | Date |
|---|---|---|
| 285,038 | Great Britain | May 9, 1929 |